United States Patent
Chou et al.

(10) Patent No.: US 11,619,701 B2
(45) Date of Patent: Apr. 4, 2023

(54) SATELLITE TRACKING SYSTEM AND METHOD THEREOF

(71) Applicant: MICROELECTRONICS TECHNOLOGY, INC., Hsinchu (TW)

(72) Inventors: Fu-Shan Chou, Hsinchu (TW); Hsiu-Ju Huang, Hsinchu (TW); Chieh-Shih Chou, Hsinchu (TW)

(73) Assignee: MICROELECTRONICS TECHNOLOGY, INC., Hsinchu (TW)

( * ) Notice: Subject to any disclaimer, the term of this patent is extended or adjusted under 35 U.S.C. 154(b) by 0 days.

(21) Appl. No.: 17/352,765

(22) Filed: Jun. 21, 2021

(65) Prior Publication Data

US 2022/0404449 A1    Dec. 22, 2022

(51) Int. Cl.
| | |
|---|---|
| *G01S 3/56* | (2006.01) |
| *G01S 3/44* | (2006.01) |
| *G01S 3/46* | (2006.01) |
| *G01S 3/48* | (2006.01) |

(52) U.S. Cl.
CPC .......... *G01S 3/44* (2013.01); *G01S 3/56* (2013.01); *G01S 3/46* (2013.01); *G01S 3/48* (2013.01)

(58) Field of Classification Search
CPC ..... G01S 3/44; G01S 3/46; G01S 3/48; G01S 3/56; G01S 19/24; G01S 19/28; H01Q 3/00
USPC ..... 342/354, 352, 357.63, 357.67, 368, 371, 342/377, 425
See application file for complete search history.

(56) References Cited

U.S. PATENT DOCUMENTS

| | | | |
|---|---|---|---|
| 4,881,078 A | 11/1989 | Yamane et al. | |
| 5,283,587 A * | 2/1994 | Hirshfield | H01Q 23/00 342/372 |
| 5,309,162 A | 5/1994 | Uematsu et al. | |
| 6,683,566 B2 * | 1/2004 | Jeon | G01S 3/14 342/383 |
| 7,373,127 B2 * | 5/2008 | Reed | H04B 7/086 455/259 |
| 10,334,454 B2 * | 6/2019 | Orhan | H04B 17/102 |
| 10,763,929 B2 * | 9/2020 | El-Rayis | H04B 7/0617 |
| 10,770,790 B1 * | 9/2020 | Mahanfar | H01Q 3/34 |
| 11,296,406 B2 * | 4/2022 | Ikematsu | H01Q 3/2629 |

(Continued)

FOREIGN PATENT DOCUMENTS

| | | |
|---|---|---|
| CN | 101207235 A | 6/2008 |
| CN | 104467947 A | 3/2015 |

(Continued)

*Primary Examiner* — Chuong P Nguyen
(74) *Attorney, Agent, or Firm* — Muncy, Geissler, Olds & Lowe, P.C.

(57) ABSTRACT

The present disclosure provides satellite tracking systems and tracking methods. The satellite tracking system includes an array of antenna elements and a control unit. A feed current for each of the antenna elements passes through a phase shifter. The control unit generates a control signal for the phase shifter. The satellite tracking system searches, positions, and tracks a target satellite in accordance with the control signal. The satellite tracking systems and methods utilize step scanning and particle swarm optimization in the search stage, compensating for gaps formed during the satellite searching in the positioning stage, and conical scanning in the tracking stage.

13 Claims, 20 Drawing Sheets

(56) References Cited

U.S. PATENT DOCUMENTS

2005/0146476 A1   7/2005  Wang et al.
2022/0200161 A1*  6/2022  Takahashi ................ H01Q 3/36

FOREIGN PATENT DOCUMENTS

WO   WO-2006019290 A1 *  2/2006   ........... H01Q 1/1257
WO   WO-2007037674 A1 *  4/2007   ............. H01Q 25/00

* cited by examiner

SATELLITE TRACKING SYSTEM AND METHOD THEREOF

TECHNICAL FIELD

The present disclosure relates to a satellite tracking system and a method thereof, and more particularly, to a satellite tracking system and method using a combination of step and conical scan operations.

DISCUSSION OF THE BACKGROUND

In order to compensate for the signal range of 5G networks, low orbit satellite communication has become an indispensable area of focus. However, the period of low orbit satellites is typically around 90 minutes, and each satellite can be used for roughly 10 minutes. Conventional satellite tracking systems and methods utilize either mechanical antenna structures that decrease tracking accuracy, or slow tracking methods that are not optimal for low orbit satellite communication. Therefore, there is an urgent need for satellite tracking systems and methods that can accurately track low orbit satellites and also search for the next available satellite quickly.

This Discussion of the Background section is provided for background information only. The statements in this Discussion of the Background are not an admission that the subject matter disclosed in this section constitutes prior art to the present disclosure, and no part of this Discussion of the Background section may be used as an admission that any part of this application, including this Discussion of the Background section, constitutes prior art to the present disclosure.

SUMMARY

One aspect of the present disclosure provides a satellite tracking system, comprising an array of antenna elements, wherein a feed current for each of the antenna elements passes through a phase shifter; and a control unit generating a control signal for the phase shifter, wherein the satellite tracking system searches, positions, and tracks a target satellite in accordance with the control signal.

In some embodiments, the satellite tracking system searches for the target satellite by approximating a location of the possible target satellite with a step scan operation, and the satellite tracking system uses a particle swarm optimization operation to find the location of the target satellite which has a stronger signal in accordance with the control signal, wherein the particle swarm optimization operation uses the approximate location of the possible target satellite as one of the initial particle and n−1 randomly generated other initial particles, where n is a natural number.

In some embodiments, when the target satellite has been detected successfully, the satellite tracking system positions the target satellite by compensating for a shift while searching for the target satellite in accordance with the control signal, wherein the search result is used as a positioning center, and a step scan operation of three degrees outward with one degree resolution is used to optimally position the target satellite.

In some embodiments, the satellite tracking system tracks the target satellite by using a conical scan operation of a plurality of sample points to determine a movement vector and a movement displacement in accordance with the control signal.

In some embodiments, the satellite tracking system computes the movement vector of the antenna elements as:

$$\vec{d} = \frac{(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center.

In some embodiments, the satellite tracking system computes the movement displacement of the antenna elements as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, $\theta$ is the scan angle, and $g^{-1}$ is the inverse of the first derivative of the signal function.

In some embodiments, the satellite tracking system further determines whether an azimuth angle and an elevation angle of the target satellite are within a predetermined range, and if affirmative, the satellite tracking system determines whether a signal of the target satellite is within a communication range, otherwise the satellite tracking system returns to searching for the target satellite in accordance with the control signal.

Another aspect of the present disclosure provides a satellite tracking system, comprising an array of antenna elements, wherein a feed current for each of the antenna elements passes through a phase shifter; one or more processors; and one or more computer-readable non-transitory storage media coupled to the one or more processors and comprising instructions operable when executed by the one or more processors to cause the satellite tracking system to generate a control signal for the phase shifter, wherein the satellite tracking system searches, positions, and tracks a target satellite in accordance with the control signal.

In some embodiments, the one or more computer-readable non-transitory storage media further comprising instructions operable when executed by the one or more processors to cause the satellite tracking system to search for the target satellite by approximating a location of the possible target satellite with a step scan operation, and use a particle swarm optimization operation to find the location of the target satellite which has a stronger signal in accordance with the control signal, wherein the particle swarm optimization operation uses the approximate location of the possible target satellite as one of the initial particle and n−1 randomly generated other initial particles, where n is a natural number.

In some embodiments, the one or more computer-readable non-transitory storage media further comprising instructions operable when executed by the one or more processors to cause the satellite tracking system to position the target satellite by compensating for a shift while searching for the target satellite in accordance with the control signal, wherein the search result is used as a positioning center, and a step scan operation of three degrees outward with one degree resolution is used to optimally position the target satellite.

In some embodiments, the one or more computer-readable non-transitory storage media further comprising instructions operable when executed by the one or more processors to cause the satellite tracking system to track the target satellite by using a conical scan operation of a plurality of sample points to determine a movement vector and a movement displacement in accordance with the control signal.

In some embodiments, the one or more computer-readable non-transitory storage media further comprising instructions operable when executed by the one or more processors to cause the satellite tracking system to compute the movement vector of the antenna elements as:

$$\vec{d} = \frac{(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center.

In some embodiments, the one or more computer-readable non-transitory storage media further comprising instructions operable when executed by the one or more processors to cause the satellite tracking system to compute the movement displacement of the antenna elements as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, $\theta$ is the scan angle, and $g^{-1}$ is the inverse of the first derivative of the signal function.

In some embodiments, the one or more computer-readable non-transitory storage media further comprising instructions operable when executed by the one or more processors to cause the satellite tracking system to determine whether an azimuth angle and an elevation angle of the target satellite are within a predetermined range, and if affirmative, the satellite tracking system determines whether a signal of the target satellite is within a communication range, otherwise the satellite tracking system returns to searching for the target satellite in accordance with the control signal.

Another aspect of the present disclosure provides a satellite tracking method, comprising providing an array of antenna elements in a satellite tracking system, wherein a feed current for each of the antenna elements passes through a phase shifter; generating, by a control unit of the satellite tracking system, a control signal for the phase shifter; searching, by the satellite tracking system, for a target satellite in accordance with the control signal; positioning, by the satellite tracking system, the target satellite in accordance with the control signal; tracking, by the satellite tracking system, the target satellite in accordance with the control signal; and determining, by the control unit, whether an azimuth angle and an elevation angle of the target satellite are within a predetermined range, and if affirmative, determining whether a signal of the target satellite is within a communication range, and if otherwise, returning to searching for the target satellite in accordance with the control signal.

In some embodiments, searching, by the satellite tracking system, for the target satellite is performed by approximating a location of the possible target satellite with a step scan operation, and the method further comprises using a particle swarm optimization operation to find the location of the target satellite which has a stronger signal in accordance with the control signal, wherein the particle swarm optimization operation uses the approximate location of the possible target satellite as one of the initial particle and n−1 randomly generated other initial particles, where n is a natural number.

In some embodiments, when the target satellite has been detected successfully, the method further comprises positioning, by the satellite tracking system, the target satellite by compensating for a shift while searching for the target satellite in accordance with the control signal, wherein the search result is used as a positioning center, and a step scan operation of three degrees outward with one degree resolution is used to optimally position the target satellite.

In some embodiments, the method further comprises tracking, by the satellite tracking system, the target satellite by using a conical scan operation of a plurality of sample points to determine a movement vector and a movement displacement in accordance with the control signal.

In some embodiments, the method further comprises computing, by the satellite tracking system, the movement vector of the antenna elements as:

$$\vec{d} = \frac{\sum_{i=1}^{N}(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center.

In some embodiments, the method further comprises computing, by the satellite tracking system, the movement displacement of the antenna elements as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, $\theta$ is the scan angle, and $g^{-1}$ is the inverse of the first derivative of the signal function.

Accordingly, the satellite tracking systems and methods in embodiments of the present disclosure can accurately track target satellites at fast processing times. The satellite tracking systems and methods are divided into search, positioning, and tracking stages. The search stage utilizes step scanning and particle swarm optimization to speed up satellite searching, the positioning stage compensates for gaps formed during the search stage, and the tracking stage uses conical scanning to track the target satellite by using all of the sample points to determine the movement vector and movement displacement of each tracking operation. Moreover, with fast processing times, the phased array antennas of the satellite tracking systems in the present disclosure can be installed in carriers such as personal vehicles to communicate with low earth orbit satellites.

The foregoing has outlined rather broadly the features and technical advantages of the present disclosure in order that the detailed description of the disclosure that follows may be better understood. Additional features and advantages of the disclosure will be described hereinafter, and form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

A more complete understanding of the present disclosure may be derived by referring to the detailed description and claims when considered in connection with the Figures, where like reference numbers refer to similar elements throughout the Figures, and:

DETAILED DESCRIPTION

Figure 1:
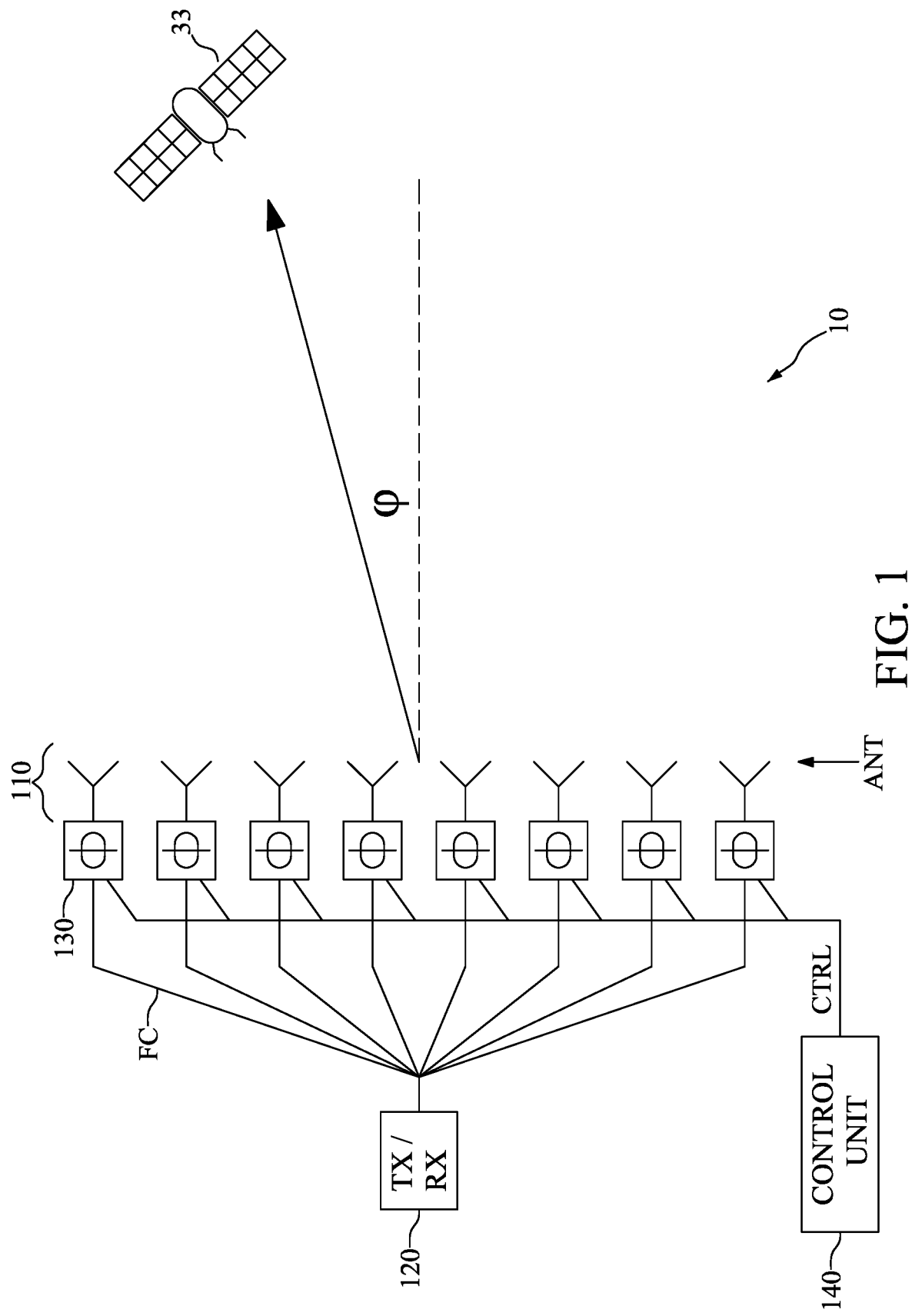
FIG. 1 depicts a schematic view of a satellite tracking system in accordance with some embodiments of the present disclosure.

Embodiments, or examples, of the disclosure illustrated in the drawings are now described using specific language. It shall be understood that no limitation of the scope of the disclosure is hereby intended. Any alteration or modification of the described embodiments, and any further applications of principles described in this document, are to be considered as normally occurring to one of ordinary skill in the art to which the disclosure relates. Reference numerals may be repeated throughout the embodiments, but this does not necessarily mean that feature(s) of one embodiment apply to another embodiment, even if they share the same reference numeral.

It shall be understood that, although the terms first, second, third, etc. may be used herein to describe various elements, components, regions, layers or sections, these elements, components, regions, layers or sections are not limited by these terms. Rather, these terms are merely used to distinguish one element, component, region, layer or section from another element, component, region, layer or section. Thus, a first element, component, region, layer or section discussed below could be termed a second element, component, region, layer or section without departing from the teachings of the present inventive concept.

The terminology used herein is for the purpose of describing particular example embodiments only and is not intended to be limited to the present inventive concept. As used herein, the singular forms "a," "an" and "the" are intended to include the plural forms as well, unless the context clearly indicates otherwise. It shall be further understood that the terms "comprises" and "comprising," when used in this specification, point out the presence of stated features, integers, steps, operations, elements, or components, but do not preclude the presence or addition of one or more other features, integers, steps, operations, elements, components, or groups thereof.

The present disclosure is directed to satellite tracking systems utilizing a combination of step and conical operations, as well as satellite tracking methods thereof. In order to make the present disclosure completely comprehensible, detailed steps and structures are provided in the following description. Obviously, implementation of the present disclosure does not limit special details known by persons skilled in the art. In addition, known structures and steps are not described in detail, so as not to limit the present disclosure unnecessarily. Preferred embodiments of the present disclosure will be described below in detail. However, in addition to the detailed description, the present disclosure may also be widely implemented in other embodiments. The scope of the present disclosure is not limited to the detailed description, and is defined by the claims.

FIG. 1 depicts a schematic view of a satellite tracking system 10 in accordance with some embodiments of the present disclosure. With reference to FIG. 1, the satellite tracking system 10 includes an array 110 of antenna elements ANT, a transmitter/receiver module 120, a phase shifter 130, and a control unit 140. In some embodiments, a feed current FC from the transmitter/receiver module 120 for driving each of the antenna elements ANT passes through the phase shifter 130. The control unit 140 generates a control signal CTRL for the phase shifter 130, and the control unit 140 controls the satellite tracking system 10 by adjusting the phase shifts of the electromagnetic waves emitted by the antenna elements ANT and changing the angle φ of a resulting beam relative to the antenna axis. It should be noted that, the transmitter/receiver module 120, the phase shifter 130, and the control unit 140 include all of the necessary circuitries and power sources (not shown) which enable their functions in the satellite tracking system 10. It should be further noted that, the array 110 of antenna elements ANT may also be a multi-dimensional phased array of antenna elements, since the simplified drawing in FIG. 1 is to facilitate understanding and should not be construed as limiting the scope of the present disclosure. Moreover, in some embodiments, the array 110 of antenna elements ANT may also be configured to receive radio signals, for example, which may be converted to electrical signals by the transmitter/receiver module 120. Although the satellite tracking system 10 depicted in FIG. 1 include a phased array 110 of antenna elements ANT, other types of antenna arrays may be also used, and the present disclosure is not limited thereto.

In some embodiments, the satellite tracking system 10 may be subdivided into search, positioning, and tracking operations. For the search operations, the satellite tracking system 10 may use step scan and particle swarm optimization to speed up the search for satellites. For example, the satellite tracking system 10 may search for the possible target satellite 33 by approximating a location of the target satellite 33 with a step scan operation, and use a particle swarm optimization operation to find the location of the target satellite 33 in accordance with the control signal CTRL. In some embodiments, the particle swarm optimization operation uses the approximate location of the possible target satellite 33 as one of the initial particle as well as n−1 randomly generated other initial particles, where n is a natural number. The satellite searching performed by the satellite tracking system 10 does not require a long time as in conventional satellite searching, which typically step scans an entire region and locates the satellite by using steps of decreasing magnitude. The satellite search stage performed by the satellite tracking system 10 includes a step scan to approximate the location of the target satellite 33, and when the satellite signal is detected, the search stage proceeds to the particle swarm optimization operation. When the step scan fails to detect the satellite signal, a new step scan is performed. If the satellite signal still cannot be detected, the search stage proceeds to the particle swarm optimization so as to maintain the success rate of the operation while effectively minimizing the search time.

Figure 2A:
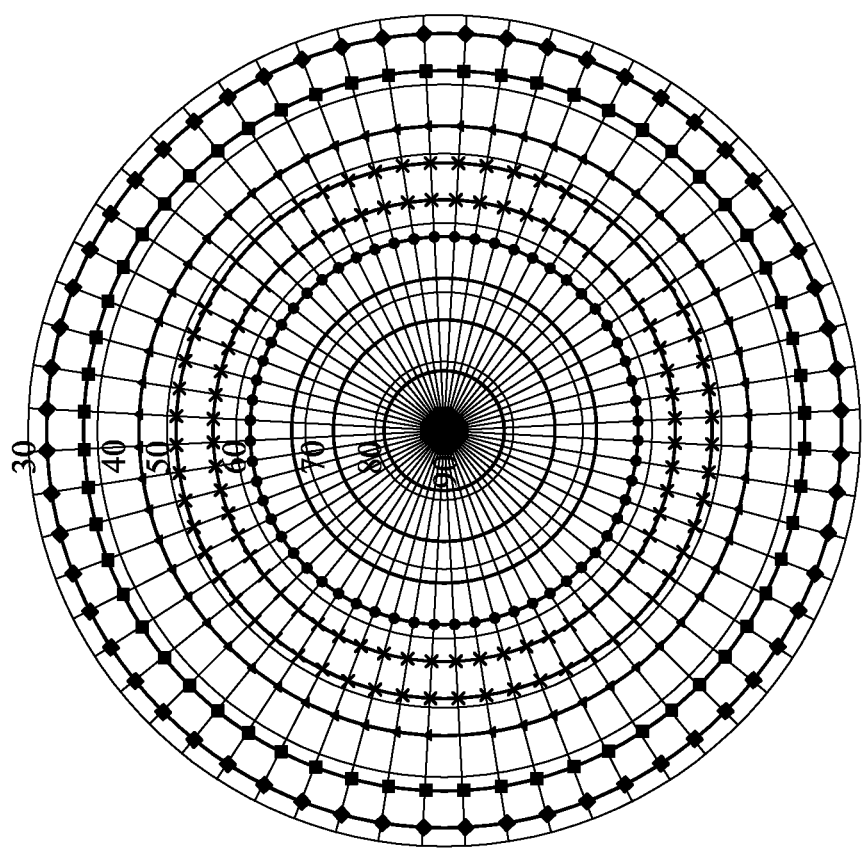
FIG. 2A to FIG. 2C are visual representations of the satellite search stage of the satellite tracking system in accordance with some embodiments of the present disclosure.
Figure 2B:
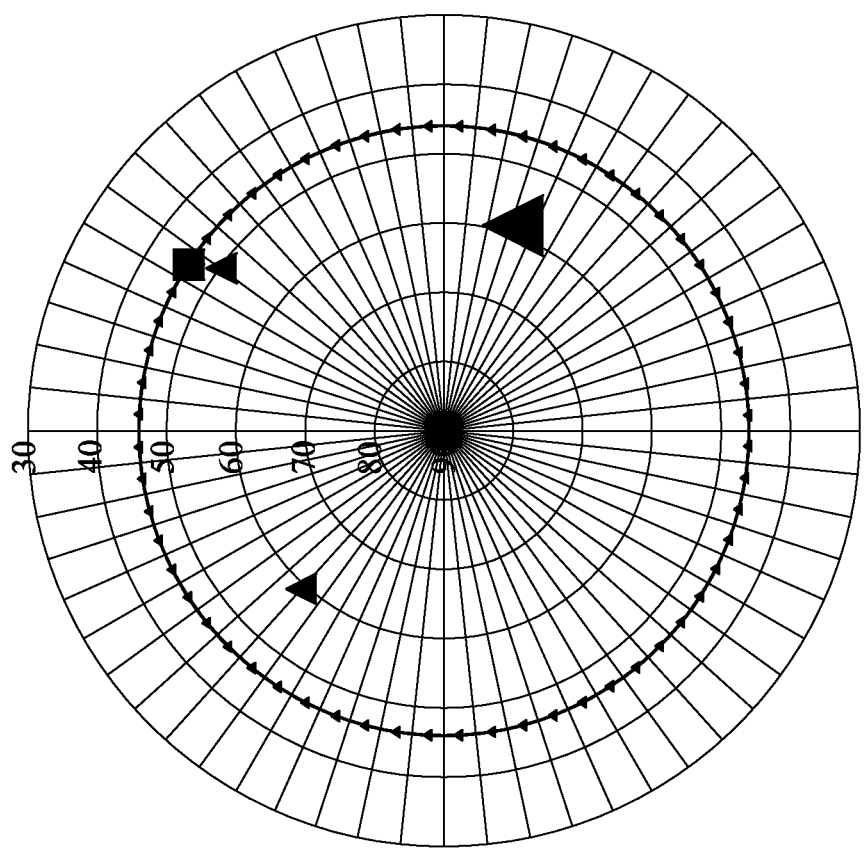
Figure 2C:
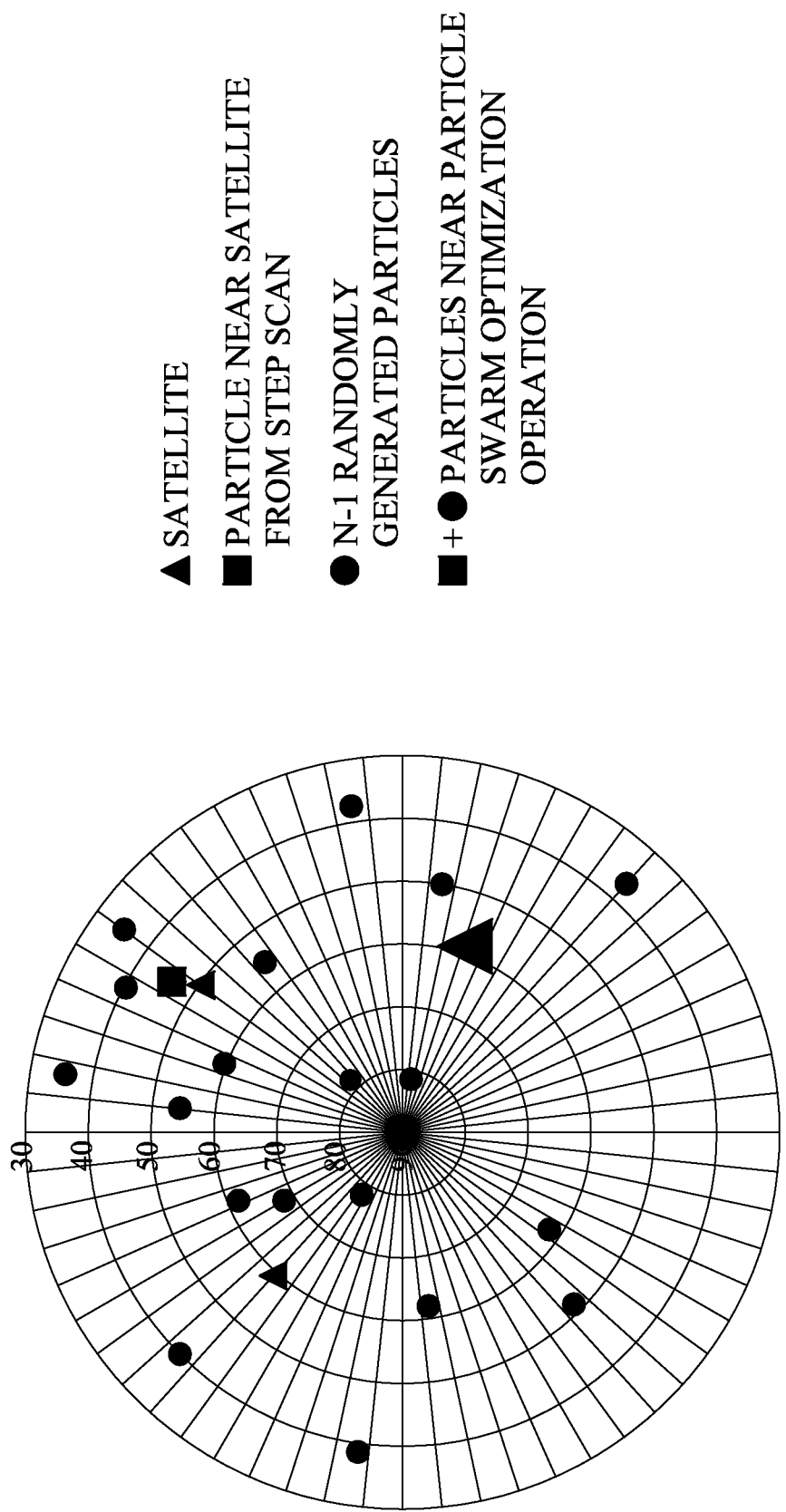

FIG. 2A to FIG. 2C are visual representations of the satellite search stage of the satellite tracking system 10 in accordance with some embodiments of the present disclosure. As shown in FIG. 2A, the satellite search stage begins with a step scan at a regular interval in an entire region to detect the satellite signal. In the example shown in FIG. 2A, the step scan operation begins at a low elevation angle and proceeds at the regular interval to detect the satellite signal, in which the step scan can proceed from outside to inside at the regular interval, from inside to outside at the regular interval, from left to right at the regular interval, from right to left at the regular interval, or the like. When the satellite signal is detected, the search stage proceeds to the particle swarm optimization operation, and if no satellite signal is detected, the step scan is performed the retry process before proceeding. As shown in FIG. 2B, when the step scan operation finds a point near the possible target satellite 33, the signal location of this point becomes one of the initial particle for the particle swarm optimization operation to further pinpoint the actual position of the target satellite 33, and the step scan operation is finished. Besides the initial particle, n−1 randomly generated particles also are populated in the space, as shown in FIG. 2C.

In some embodiments, when the target satellite 33 has been detected successfully, the satellite tracking system 10 positions the target satellite 33 by compensating for a shift while searching for the target satellite 33 in accordance with the control signal CTRL. The search result from the search stage is used as a positioning center, and a step scan operation of three degrees outward with one degree resolution is used to optimally position the target satellite 33. Although the position found in the satellite search stage and its particle swarm optimization operation is close to the actual location of the target satellite 33, positioning is required since the satellite 33 may be a low orbit satellite that has moved during the time to perform the particle swarm optimization. The step scan operation of three degrees in the positioning stage is to account for the satellite shift during the satellite search stage, and by finding the optimal point in this scan range, the location of the target satellite 33 can be found.

Figure 3A:
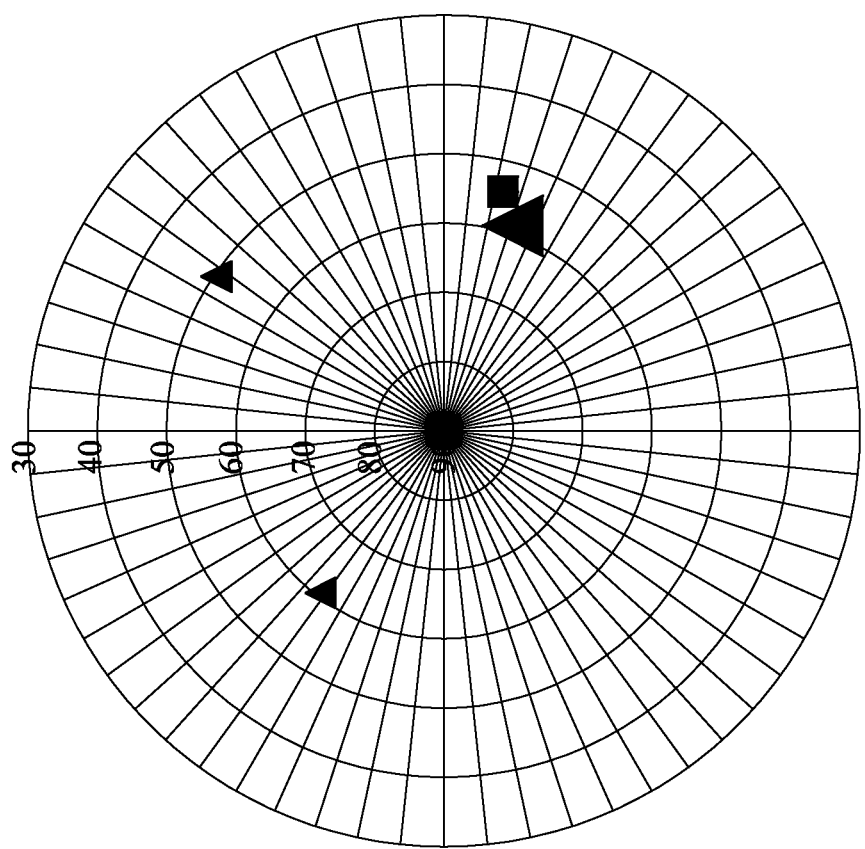
FIG. 3A to FIG. 3C are visual representations of the satellite positioning stage of the satellite tracking system in accordance with some embodiments of the present disclosure.
Figure 3B:
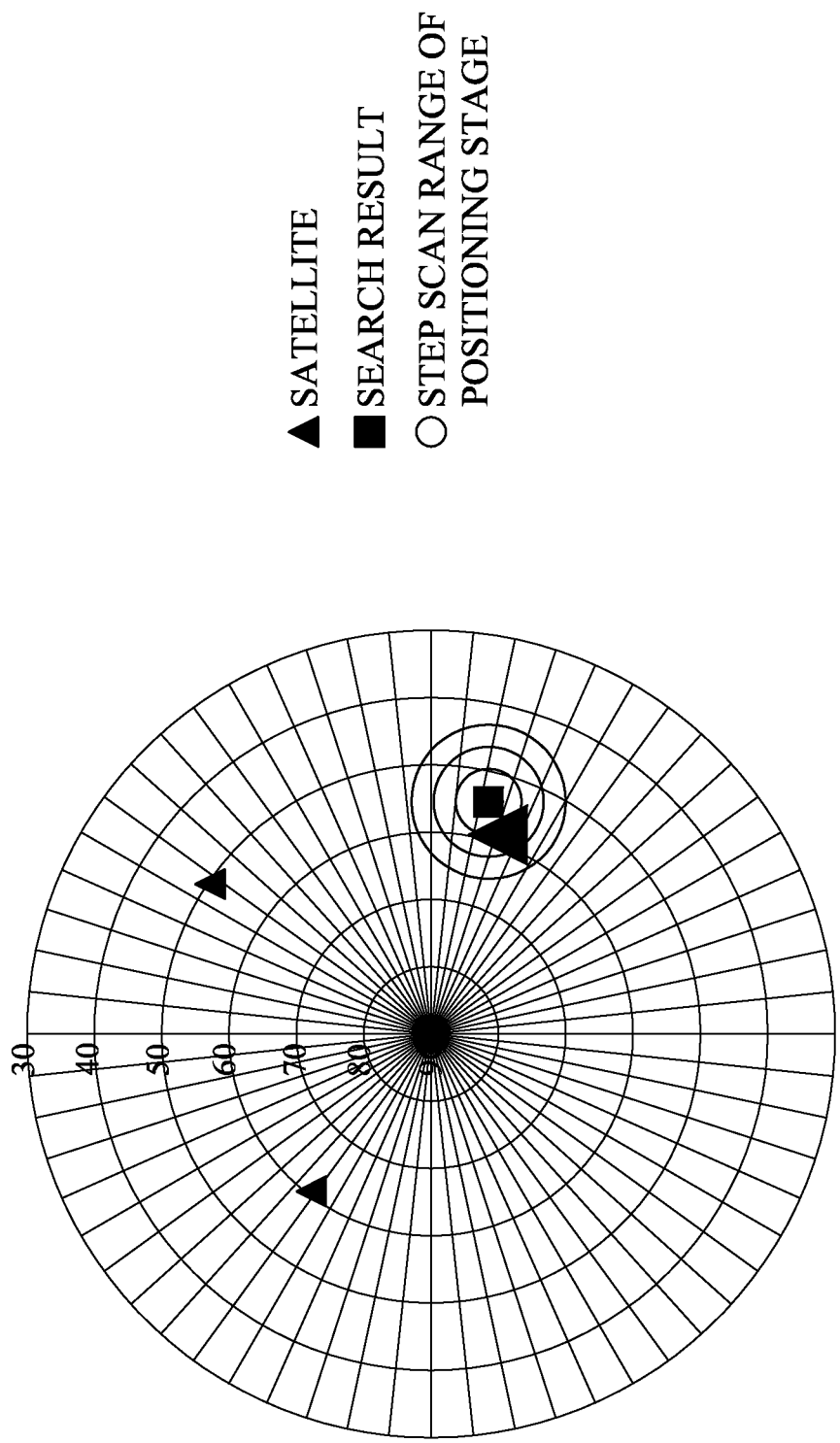
Figure 3C:
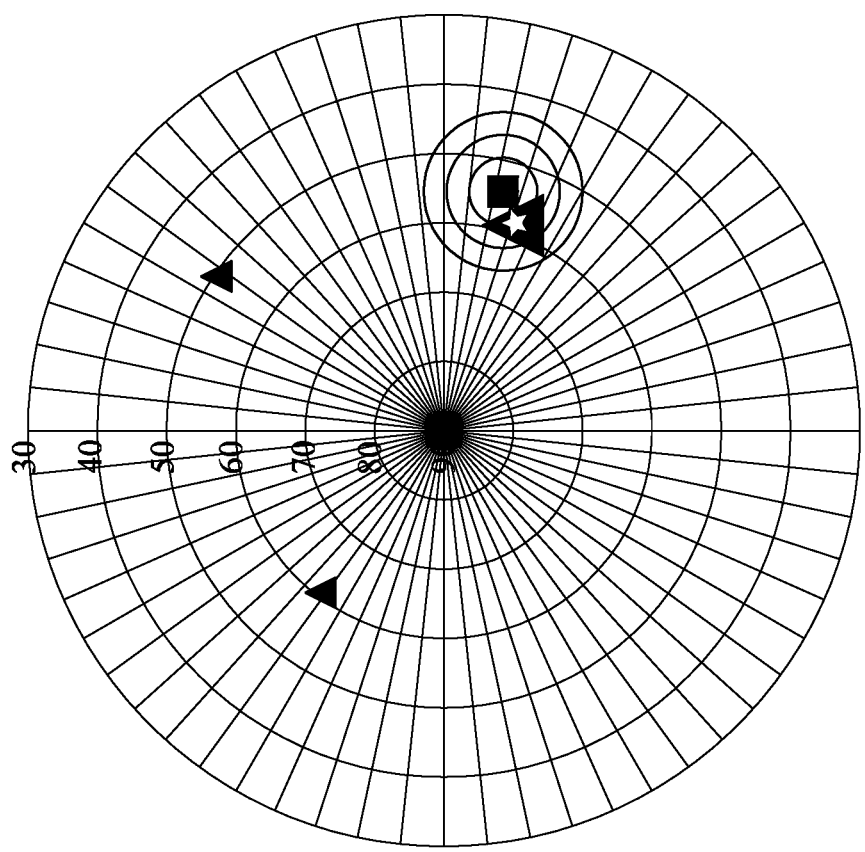

Accordingly, the satellite positioning further optimizes the positioning of the target satellite 33 and increases the accuracy of the scans performed by the satellite tracking system 10. FIG. 3A to FIG. 3C are visual representations of the satellite positioning stage of the satellite tracking system 10 in accordance with some embodiments of the present disclosure. FIG. 3A depicts an initial condition of the positioning stage, FIG. 3B shows a step scan range of the positioning stage, and FIG. 3C depicts a result of the positioning stage according to some embodiments of the present disclosure. By narrowing the scan range in the positioning stage and using the search result as the positioning center, the interval of the step scan can be further decreased, and the position of the target satellite 33 can be determined accurately without a long processing time. The positioning stage of the satellite tracking system 10 may include obtaining the search result from the search stage as a reference point, using the reference point as positioning center and performing a step scan operation of three degrees outward with one degree resolution, generating sampling points on the path of the three degrees step scan, detecting a signal of the sampling points, and using the sampling point with the largest signal as the positioning point.

When the satellite tracking system 10 completes the positioning stage, the positioning result is substantially near the target satellite 33, and therefore the satellite tracking system 10 enters into a tracking stage. In some embodiments, during the tracking stage, the satellite tracking system 10 may automatically adjust the angle φ of the array 110 of antenna elements ANT according to the control signal CTRL. In order to satisfy the requirements of the satellite tracking system 10, the conical scan algorithms used in the tracking stage of the satellite tracking system 10 are substantially faster and more accurate than those found in conventional conical scan systems. In conical scan systems, using current beam pointing axis as the central axis, and the scan beam is directed at a scan angle θ to the central axis to perform the conical scan operation. When the target is not on the central axis, the conical scan generates signal errors due to the varying distances from the target. By analyzing the signal errors, the central axis can be controlled to move toward the direction of the target, until the central axis is directed at the target again.

Figure 4:
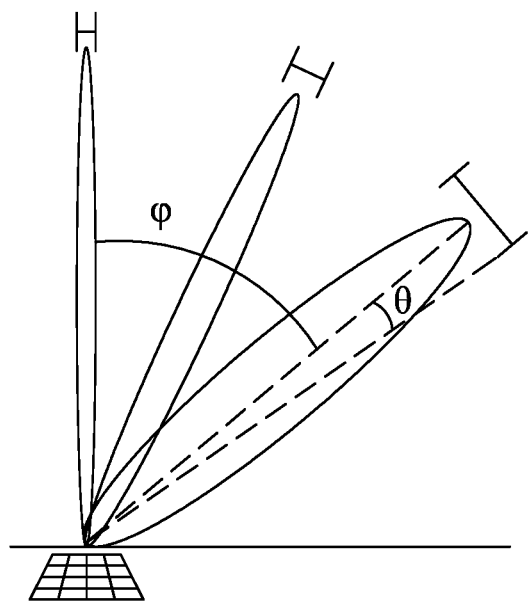
FIG. 4 is an illustrative diagram of beam width changes of a phased array antenna in accordance with some embodiments of the present disclosure.

FIG. 4 is an illustrative diagram of beam width changes of a phased array antenna in accordance with some embodiments of the present disclosure. In some embodiments, the scan angle θ used by the satellite tracking system 10 is a dynamic scan angle because phased array antennas may emit scan beams with different beam widths at different angles φ as shown in FIG. 4. When the angle φ for the antenna beam is at a minimum, the antenna beam is concentrated, and therefore a scan angle θ of one degree may be selected, for example. On the other hand, when the angle φ for the antenna beam is at a maximum, the antenna beam is more divergent, and therefore a scan angle θ of three degrees may be selected, for instance.

During a conical scan operation, a predetermined amount of points on a scan path may be sampled. However, the target of the conical scan may not be located in the direction pointed by the sample points. Therefore, if the direction of the best sampling point is directly used as the movement vector, this movement vector will not reflect the actual direction of the target. The solution is that the satellite tracking system 10 tracks the target satellite 33 by using a conical scan operation of a plurality of sample points to determine a movement vector and a movement displacement in accordance with the control signal CTRL.

Figure 5A:
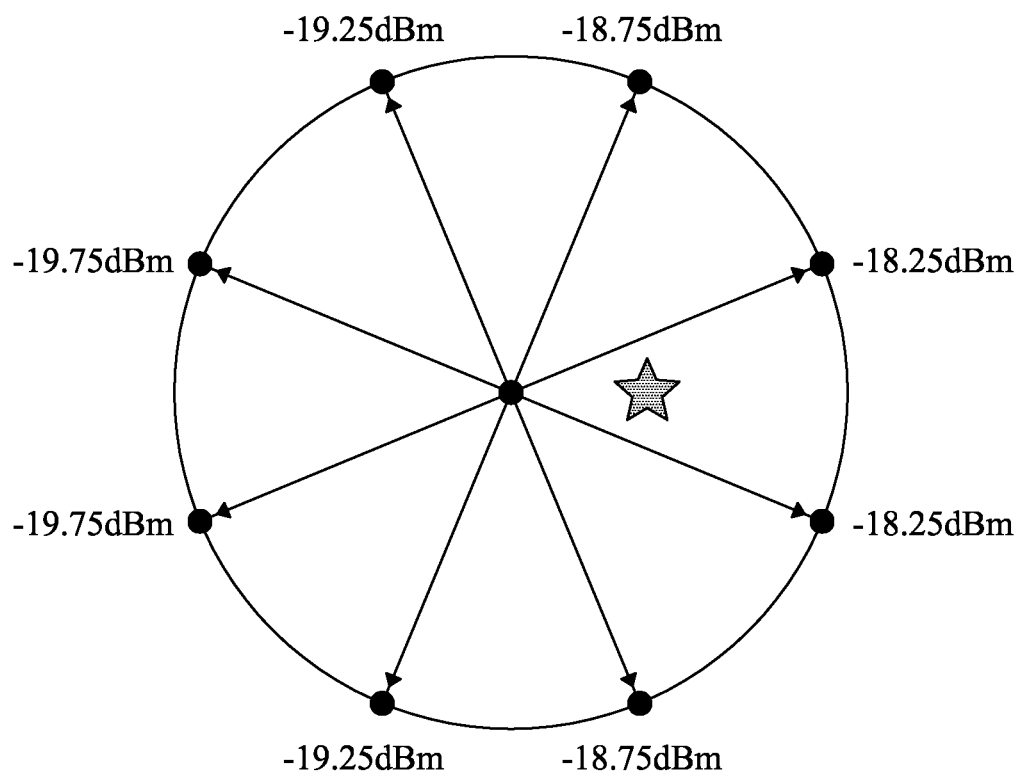
FIG. 5A to FIG. 5C depict a result of a movement vector computation in accordance with some embodiments of the present disclosure.
Figure 5B:
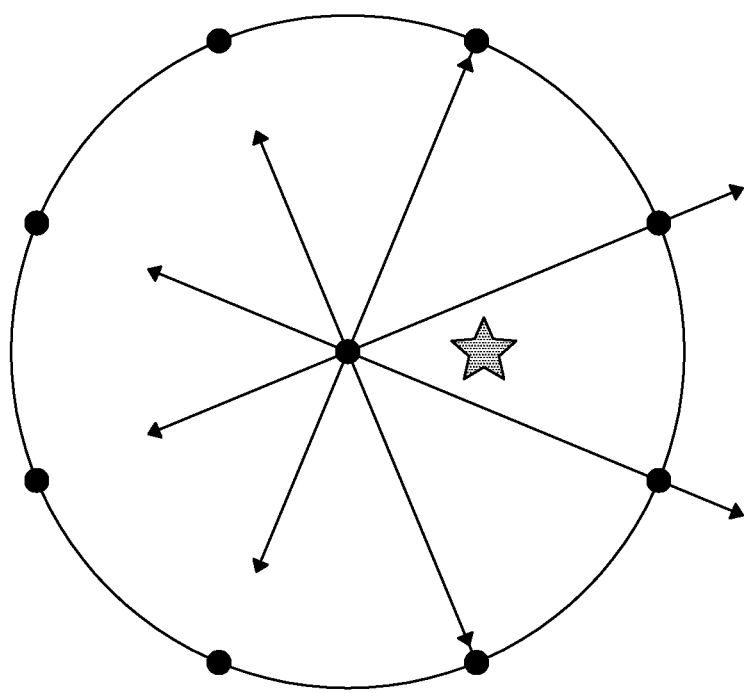
Figure 5C:
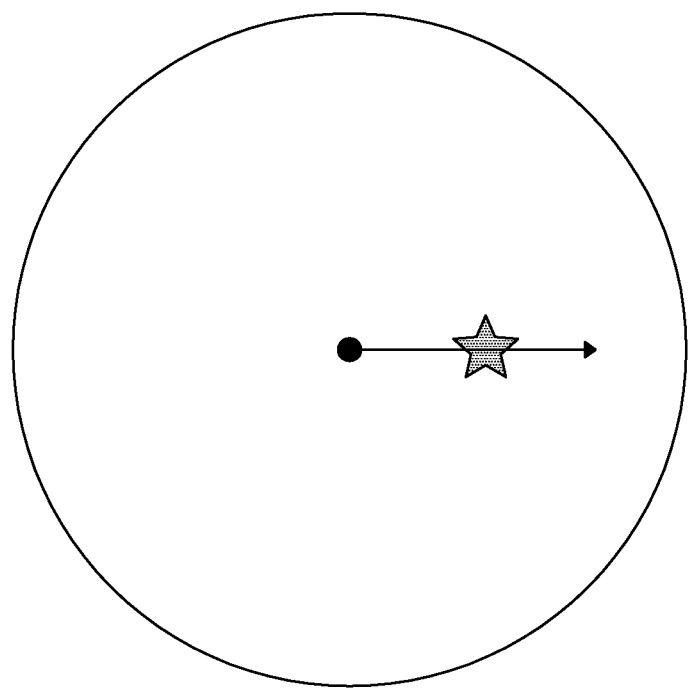

FIG. 5A to FIG. 5C depict a result of a movement vector computation in accordance with some embodiments of the present disclosure. With reference to FIG. 5A to FIG. 5C, according to embodiments of the present disclosure, the satellite tracking system 10 references the signal strengths of all of the sample points to compute the moving vector. In some embodiments, the computation of the movement vector performed by the control unit 140, for example, determines the movement direction of the antenna elements ANT for tracking the target satellite 33. The computation of the movement vector includes multiplying the weightings of the signal strength of each sample point by a directional vector of the sample point relative to a reference point, and then summing and averaging all the results to find the optimal movement direction. Accordingly, the control unit 140 of the satellite tracking system 10 computes the movement vector of the antenna elements ANT as:

$$\vec{d} = \frac{\sum_{i=1}^{N}(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center.

Figure 6:
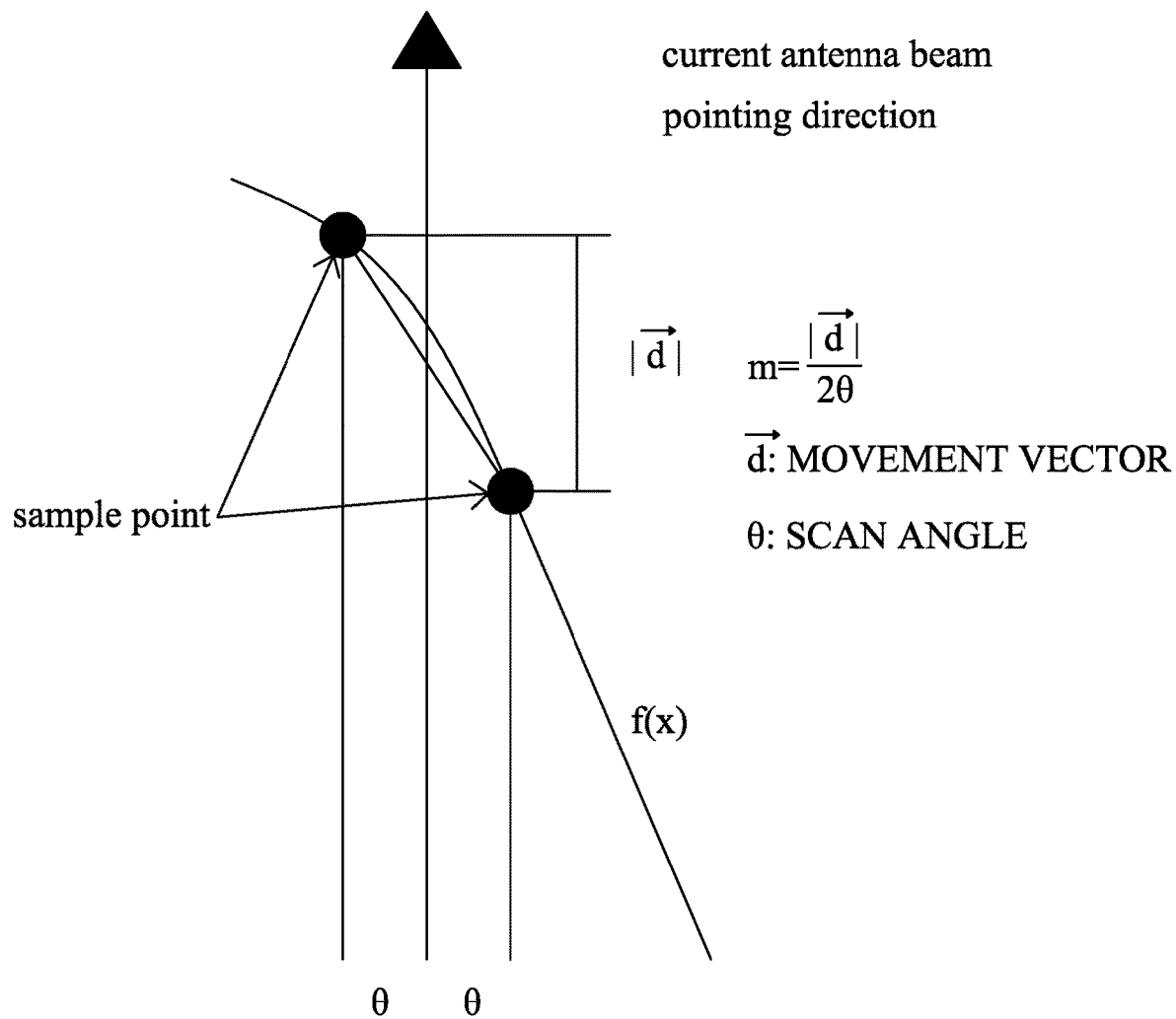
FIG. 6 is an illustrative diagram depicting a relationship of a conical scan operation and the signal function in accordance with some embodiments of the present disclosure.
Figure 7A:
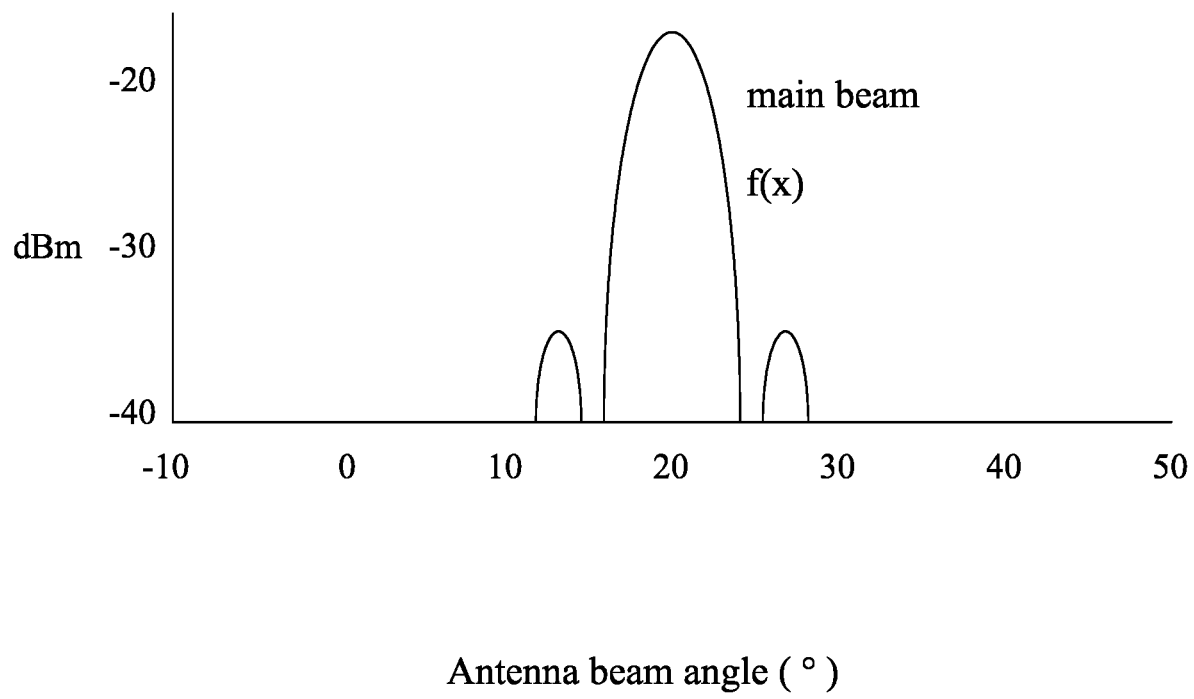
FIG. 7A is a graphical representation of a signal function in accordance with some embodiments of the present disclosure.
Figure 7B:
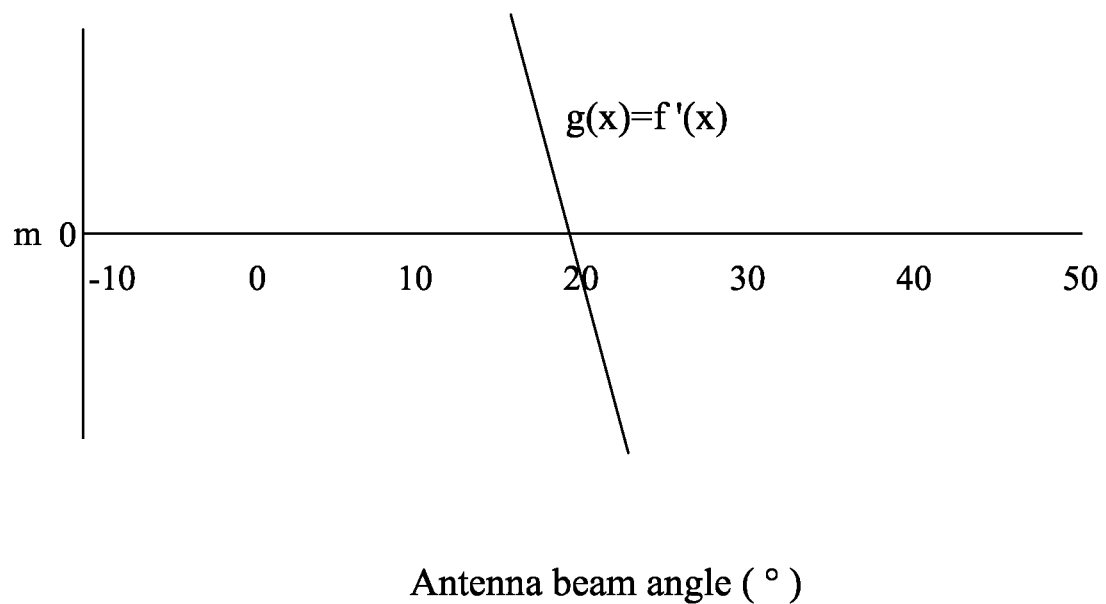
FIG. 7B is a graphical representation of the first derivative of a signal function in accordance with some embodiments of the present disclosure.
Figure 8:
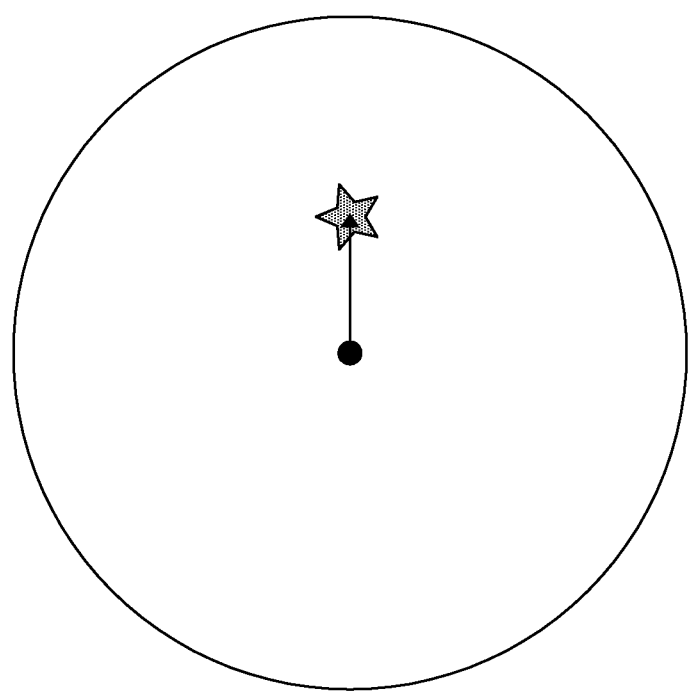
FIG. 8 is an illustrative diagram showing a conical scan result in accordance with some embodiments of the present disclosure.
Figure 8:
Figure 8:
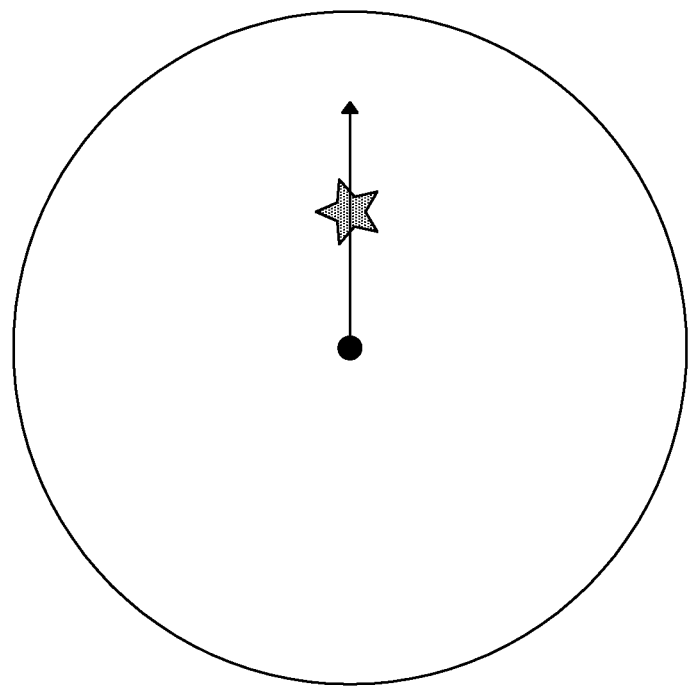

FIG. 6 is an illustrative diagram depicting a relationship of a conical scan operation and the signal function in accordance with some embodiments of the present disclosure. In some embodiments, the computed movement vector $\vec{d}$ represents the movement direction, whereas the scalar $|\vec{d}|$ of the movement vector $|\vec{d}|$ represents a signal difference between the sample points. By analyzing the signal difference, the angular difference between the current antenna beam angle and the actual angle of satellite can be calculated, as shown in FIG. 6. FIG. 7A is a graphical representation of the signal function in accordance with some embodiments of the present disclosure, and FIG. 7B is a graphical representation of the first derivative of the signal function in accordance with some embodiments of the present disclosure. FIG. 8 is an illustrative diagram showing a conical scan result in accordance with some embodiments of the present disclosure. With reference to FIGS. 7A and 7B, when looking at the signal function $f(x)$ of the main beam, the first derivative g (x) of the signal function $f(x)$ is a linear function. The Y-axis in g(x) represents the rate of signal change of each point of the signal function. Therefore, by substituting $$\frac{|\vec{d}|}{2\theta}$$

into $g^{-1}(x)$ the inverse function of g(x) and subtracting by $g^{-1}(0)$, a movement displacement between current antenna beam angle and the actual angle of satellite can be obtained. Accordingly, the control unit 140 satellite tracking system 10 computes a movement displacement of the antenna elements ANT as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, θ is the scan angle, and $g^{-1}$ is the inverse of the first derivative of the signal function. It should be noted that, the movement displacement computed with Equation 2 by the control unit 140 may be used to obtain the angular displacement between the antenna elements ANT and the target satellite 33. Moreover, the movement velocity of the antenna elements ANT can also be controlled. In some embodiments, the satellite tracking system 10 further determines whether an azimuth angle and an elevation angle of the target satellite 33 are within a predetermined range, and if affirmative, the satellite tracking system determines whether a signal of the target satellite 33 is within a communication range, otherwise the satellite tracking system 10 returns to the searching stage for the target satellite 33 in accordance with the control signal CTRL. As shown in FIG. 8, the conical scan operation performed by the satellite tracking system 10 presents a fast and accurate result.

Figure 9:
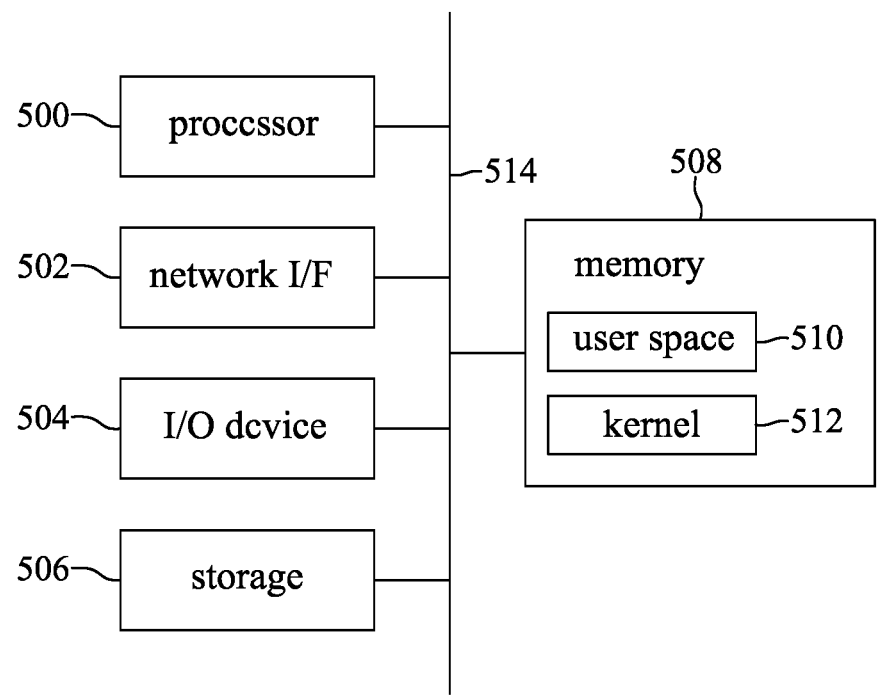
FIG. 9 is a block diagram of a computer system in accordance with some embodiments of the present disclosure.

It should be noted that, one or more of the systems, subsystems, tools, methods, or operations described in the present disclosure may be realized by a computer system including instructions operable when executed by one or more processors of the computer system. For example, the control unit 140 and a satellite tracking method 600 described later in the present disclosure may be implemented by a computer system depicted in FIG. 9. FIG. 9 is a block diagram of a computer system 80 in accordance with some embodiments of the present disclosure. With reference to FIG. 9, the computer system 80 may include one or more processors 500, a network interface (I/F) 502, a storage device 506, a memory 508, and an input/output (I/O) device 504 communicatively coupled via a bus 514 or other interconnection communication mechanism. The memory 508 includes, in some embodiments, a random access memory (RAM), other dynamic storage device, read-only memory (ROM), or other static storage device, coupled to the bus 514 for storing data or instructions to be executed by the one or more processors 500, and the memory 508 may include a user space 510, a kernel 512, portions of the kernel or the user space, and components thereof. The memory 508 may also be used, in some embodiments, for storing temporary variables or other intermediate information during execution of instructions to be executed by the one or more processors 500.

In some embodiments, the storage device 506 is coupled to the bus 514 for transferring data or instructions to the user space 510 or the kernel 512, for example. In some embodiments, the operations and functionalities are realized as functions of a program stored in the storage device 506, which may include one or more computer-readable non-transitory storage media coupled to the one or more processors 500. Examples of the computer-readable non-transitory storage media include, but are not limited to, external/removable or internal/built-in storage or memory unit, e.g., one or more of an optical disk, such as a DVD, a magnetic disk, such as a hard disk, a semiconductor memory, such as a ROM, a RAM, a memory card, and the like. In some embodiments, the computer-readable non-transitory storage media of the storage device 506 includes instructions operable when executed by the one or more processors 500 to cause the satellite tracking system 10 to generate the control signal CTRL for the phase shifter 130, in which the satellite tracking system 10 searches, positions, and tracks the target satellite 33 in accordance with the control signal CTRL.

In some embodiments, the one or more computer-readable non-transitory storage media further includes instructions operable when executed by the one or more processors 500 to cause the satellite tracking system to search for the target satellite 33 by approximating a location of the target satellite 33 with a step scan operation, and use a particle swarm optimization operation to find the location of the target satellite 33 in accordance with the control signal CTRL. The particle swarm optimization operation uses the approximate location of the possible target satellite 33 as one of the initial particle and n−1 randomly generated other initial particles, where n is a natural number.

In some embodiments, the one or more computer-readable non-transitory storage media further includes instructions operable when executed by the one or more processors 500 to cause the satellite tracking system 10 to position the target satellite 33 by compensating for a shift while searching for the target satellite in accordance with the control signal CTRL. The search result is used as a positioning center, and a step scan operation of three degrees outward with one degree resolution is used to optimally position the target satellite 33.

In some embodiments, the one or more computer-readable non-transitory storage media further includes instructions operable when executed by the one or more processors 500 to cause the satellite tracking system 10 to track the target satellite 33 by using a conical scan operation of a plurality of sample points to determine a movement vector and a movement displacement in accordance with the control signal CTRL.

In some embodiments, the one or more computer-readable non-transitory storage media further includes instructions operable when executed by the one or more processors 500 to cause the satellite tracking system 10 to cause the satellite tracking system 30 to compute the movement vector of the antenna elements as:

$$\vec{d} = \frac{\sum_{i=1}^{N}(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center.

In some embodiments, the one or more computer-readable non-transitory storage media further includes instructions operable when executed by the one or more processors 500 to cause the satellite tracking system 10 to compute the movement displacement of the antenna elements as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, $\theta$ is the scan angle, and $g^{-1}$ is the inverse of the first derivative of the signal function.

In some embodiments, the one or more computer-readable non-transitory storage media further includes instructions operable when executed by the one or more processors 500 to cause the satellite tracking system 10 to determine whether an azimuth angle and an elevation angle of the target satellite 33 are within a predetermined range, and if affirmative, the satellite tracking system 10 determines whether a signal of the target satellite 33 is within a communication range, otherwise the satellite tracking system 10 returns to searching for the target satellite 33 in accordance with the control signal CTRL.

In some embodiments, the I/O device 504 includes an input device, an output device, or a combined input/output device for enabling user interaction with the control unit 140. An input device may include, for example, a keyboard, keypad, mouse, trackball, trackpad, or cursor direction keys for communicating information and commands to the processor 500. An output device may include, for example, a display, a printer, a voice synthesizer, etc. for communicating information to a user. In some embodiments, one or more operations or functionalities of the systems, subsystems, tools, and methods described in the present disclosure are realized by the one or more processors 500 of the computer system 80, which is programmed for performing such operations and functionalities. One or more of the memory 508, the network I/F 502, the storage device 506, the I/O device 504, and the bus 514 are operable to receive instructions, data, design rules, netlists, layouts, models and other parameters for processing by the processor 500. In some embodiments, one or more of the operations and functionalities of the systems, subsystems, tools, and methods described in the present disclosure may be implemented by specifically configured hardware (e.g., by one or more application specific integrated circuits (ASICs)) separate from or in lieu of the processor 500. Some embodiments may incorporate more than one of the described operations or functionality in a single ASIC.

Figure 10:
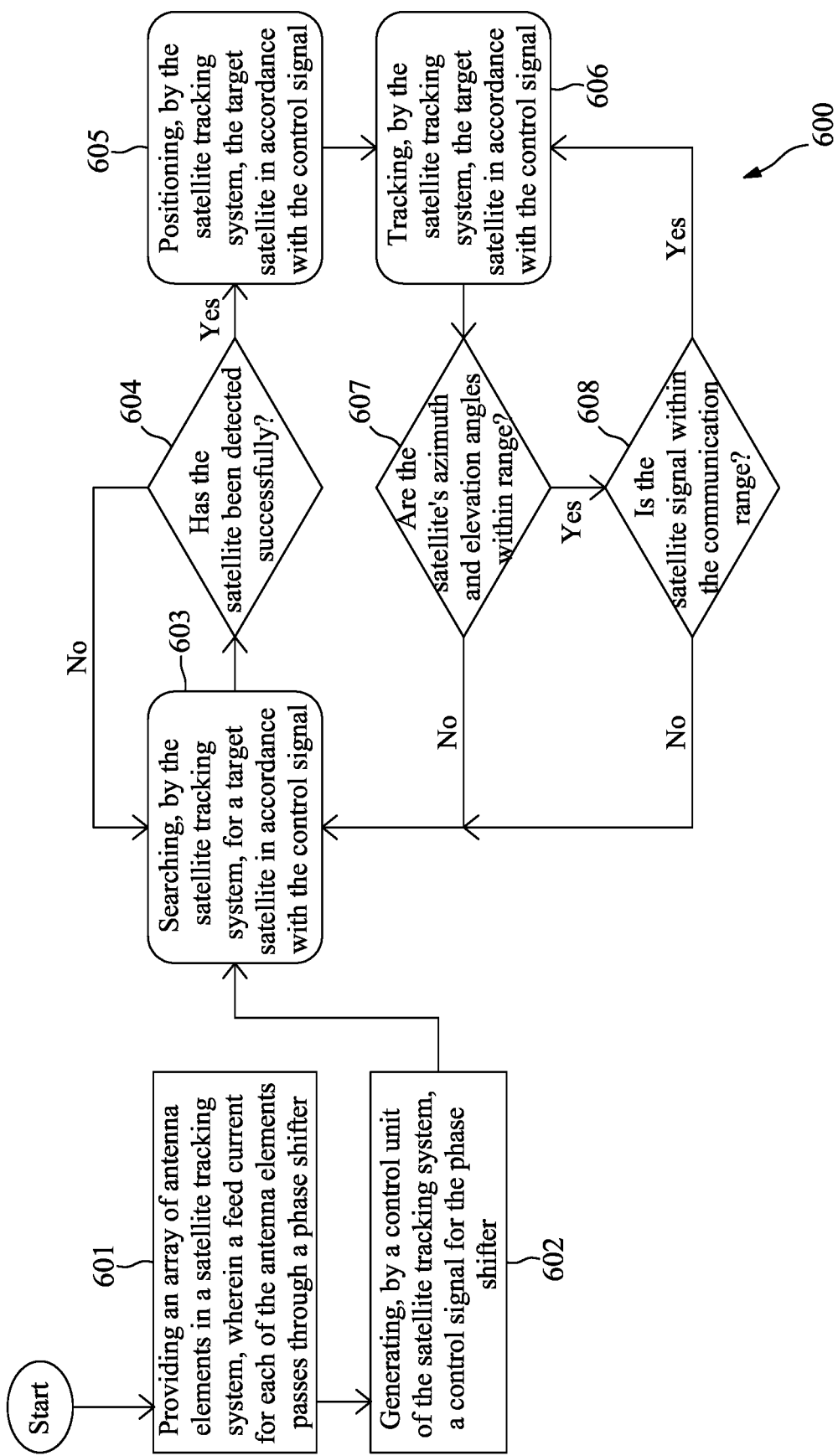
FIG. 10 is a flow diagram of a satellite tracking method in accordance with some embodiments of the present disclosure.

FIG. 10 is a flow diagram of a satellite tracking method 600 in accordance with some embodiments of the present disclosure. In some embodiments, the satellite tracking method 600 may be implemented by the satellite tracking system 10 depicted in FIG. 1 to FIG. 8, and the method 600 may also be realized by the computer system 80 depicted in FIG. 9. With reference to FIG. 10, the satellite tracking method 600 for controlling the semiconductor manufacturing equipment includes: providing the array 110 of antenna elements ANT in the satellite tracking system 10, wherein the feed current FC for each of the antenna elements ANT passes through the phase shifter 130 (Step 601); generating, by the control unit 140 of the satellite tracking system 10, the control signal CTRL for the phase shifter 130 (Step 602); searching, by the satellite tracking system 10, for the target satellite 33 in accordance with the control signal CTRL (search stage; Step 603); determining whether the target satellite 33 has been detected (Step 604); positioning, by the satellite tracking system 10, the target satellite 33 in accordance with the control signal CTRL (Step 605); tracking, by the satellite tracking system 10, the target satellite 33 in accordance with the control signal CTRL (Step 606); and determining, by the control unit 140, whether an azimuth angle and an elevation angle of the target satellite 33 are within a predetermined range (Step 607), and if affirmative, determining whether a signal of the target satellite is within a communication range, and if otherwise, returning to searching for the target satellite in accordance with the control signal (Step 608).

Figure 11:
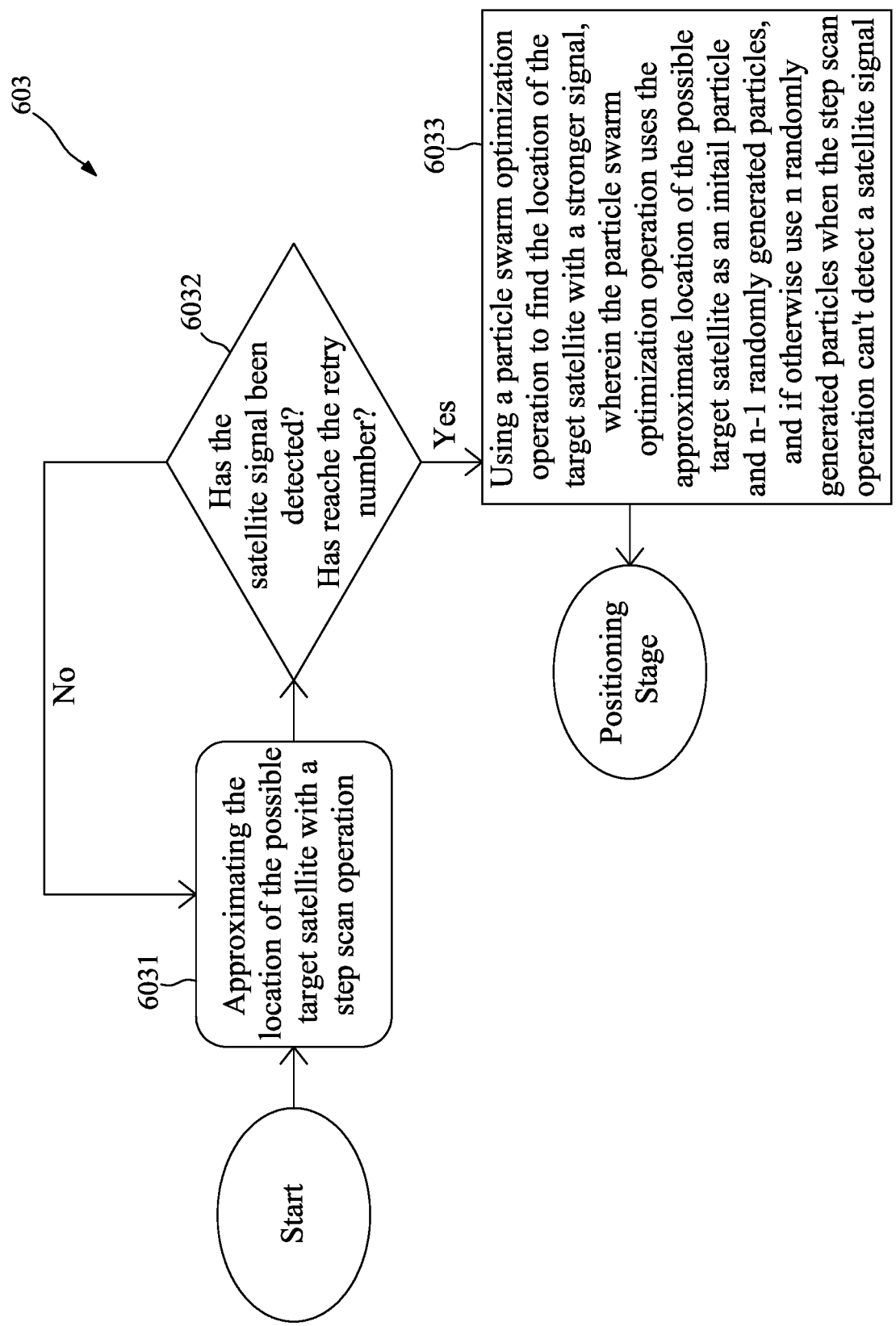
FIG. 11 is a flow diagram of a search stage in a satellite tracking method in accordance with some embodiments of the present disclosure.

FIG. 11 is a flow diagram of the search stage 603 in the satellite tracking method 600 in accordance with some embodiments of the present disclosure. With reference to FIG. 11, in some embodiments, searching, by the satellite tracking system 10, for the target satellite 33 is performed by approximating a location of the possible target satellite 33 with a step scan operation (Step 6031). Whether the signal of the possible target satellite 33 has been detected is determined, and if not, returning to Step 6031 (Step 6032), if the signal of the possible target satellite 33 still cannot be detected, the search stage proceeds to the particle swarm optimization (Step 6033). If the signal of the possible target satellite 33 has been detected, the method 600 further comprises using a particle swarm optimization operation to find the location of the target satellite 33 with a stronger signal in accordance with the control signal CTRL, wherein the particle swarm optimization operation uses the approximate location of the possible target satellite 33 as one of the initial particle and n−1 randomly generated other initial particles, and if otherwise use n randomly generated all particles when the step scan operation can't detect a satellite signal, where n is a natural number (Step 6033).

Figure 12:
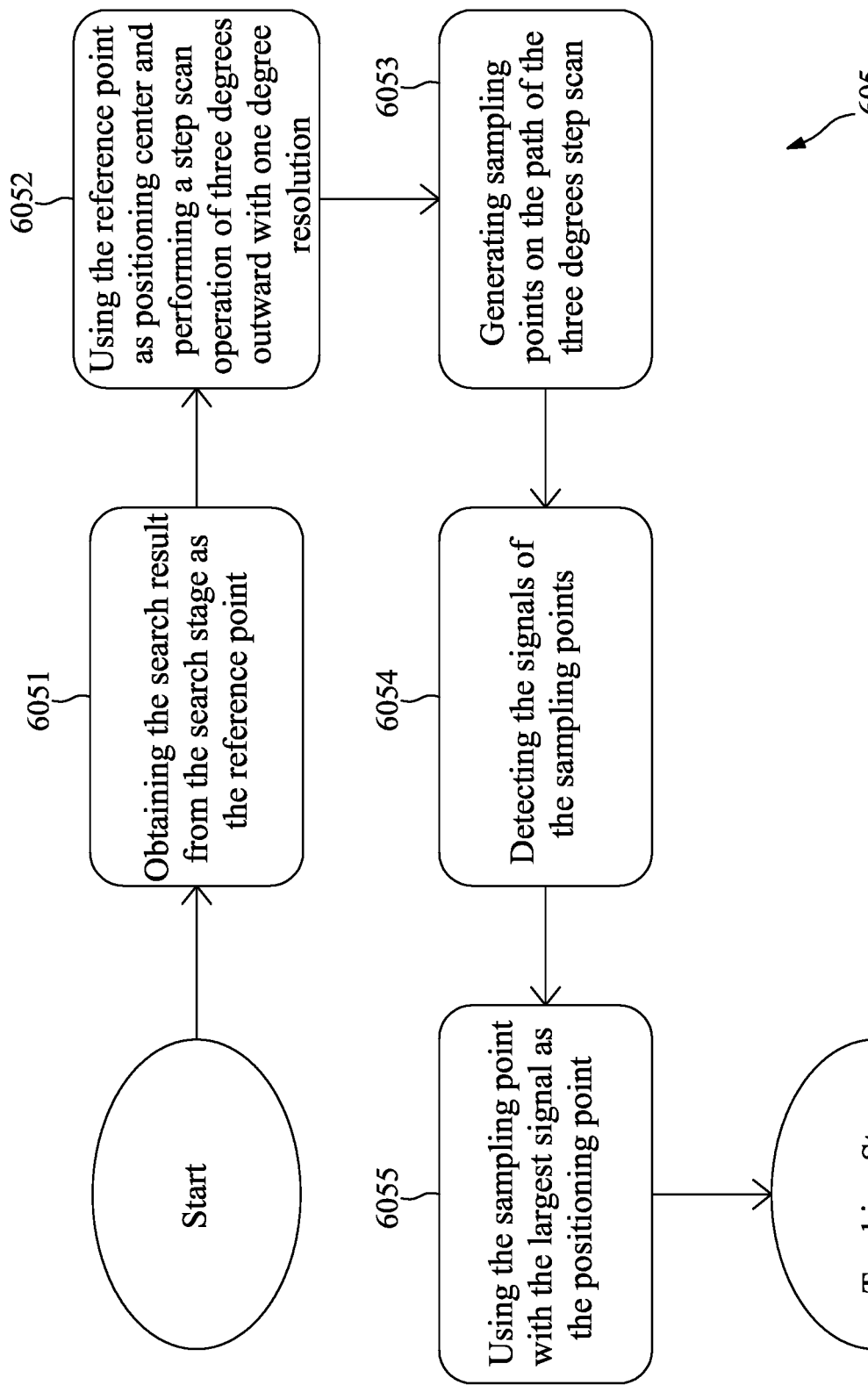
FIG. 12 is a flow diagram of a positioning stage in a satellite tracking method in accordance with some embodiments of the present disclosure.

FIG. 12 is a flow diagram of the positioning stage 605 in the satellite tracking method 600 in accordance with some embodiments of the present disclosure. With reference to FIG. 12, in some embodiments, when the target satellite 33 has been detected successfully, the method 600 further comprises positioning, by the satellite tracking system 10, the target satellite 33 by compensating for a shift while searching for the target satellite 33 in accordance with the control signal CTRL, wherein the search result is used as a positioning center, and a step scan operation of three degrees outward with one degree resolution is used to optimally position the target satellite. In detail, the positioning stage 605 of the satellite tracking system 10 may include obtaining the search result from the search stage as the reference point (Step 6051), using the reference point as the pointing center and performing a step scan operation of three degrees outward with one degree resolution (Step 6052), generating sampling points on the path of the three degrees step scan (Step 6053), detecting the signals of the sampling points (Step 6054), and using the sampling point with the largest signal as the positioning point (Step 6055). By narrowing the scan range in the positioning stage 604 and using the search result as the positioning center, the interval of the step scan can be further decreased, and the position of the target satellite 33 can be determined accurately without a long processing time.

Figure 13:
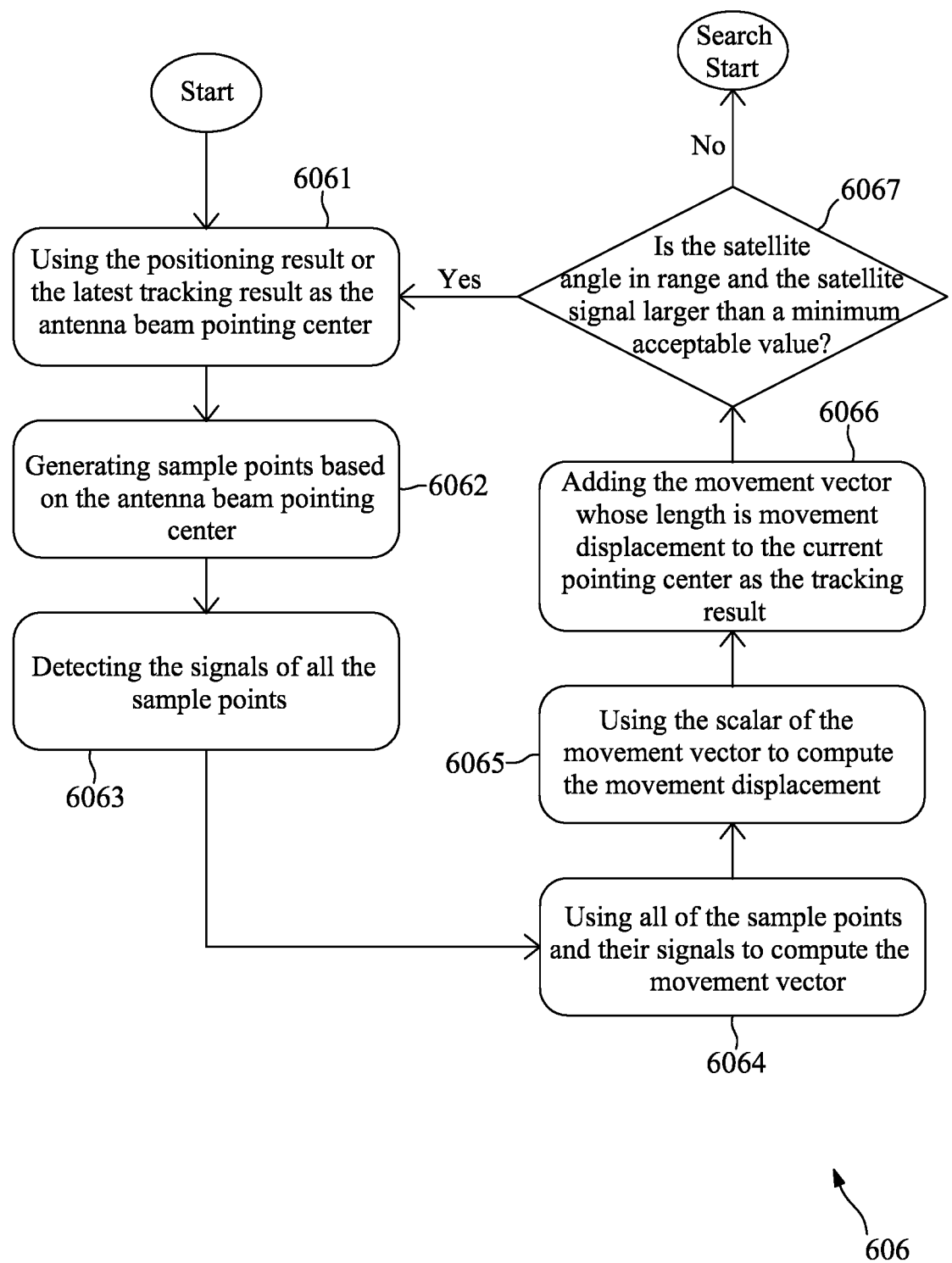
FIG. 13 is a flow diagram of a tracking stage in a satellite tracking method in accordance with some embodiments of the present disclosure.

FIG. 13 is a flow diagram of the tracking stage 606 in the satellite tracking method 600 in accordance with some embodiments of the present disclosure. With reference to FIG. 13, in some embodiments, the method 600 further comprises tracking, by the satellite tracking system 10, the target satellite 33 by using a conical scan operation of a plurality of sample points to determine a movement vector and a movement displacement in accordance with the control signal. In some embodiments, the method 600 further comprises computing by the satellite tracking system, a movement vector of the antenna elements as:

$$\vec{d} = \frac{\sum_{i=1}^{N}(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center. In some embodiments, the method 600 further comprises computing, by the satellite tracking system, a movement displacement of the antenna elements as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, $\theta$ is the scan angle, and $g^{-1}$ is the inverse of the first derivative of the signal function. In detail, the tracking stage 606 may include using the positioning result or the latest tracking result as the antenna beam pointing center (Step 6061); generating sample points based on the antenna beam pointing center (Step 6062); detecting the signals of all the sample points (Step 6063); using all of the sample points and their signals to compute the movement vector (Step 6064); using the scalar of the movement vector to compute the movement displacement (Step 6065); adding the movement vector whose length is movement displacement to the current pointing center as the tracking result (Step 6066); and determining whether the satellite angle is in range and the satellite signal larger than a minimum acceptable value, and if affirmative, proceeding to Step 6061, and if not, returning to the search stage 603 (Step 6067).

Accordingly, the satellite tracking systems and methods in embodiments of the present disclosure can accurately track target satellites at fast processing times. The satellite tracking systems and methods are divided into search, positioning, and tracking stages. The search stage utilizes step scanning and particle swarm optimization to speed up satellite searching, the positioning stage compensates for gaps formed during the search stage, and the tracking stage uses conical scanning to track the target satellite by using all of the sample points to determine the movement vector and movement displacement of each tracking operation. Moreover, with fast processing times, the phased array antennas of the satellite tracking systems in the present disclosure can be installed in carriers such as personal vehicles to communicate with low earth orbit satellites.

One aspect of the present disclosure provides a satellite tracking system, comprising an array of antenna elements, wherein a feed current for each of the antenna elements passes through a phase shifter; and a control unit generating a control signal for the phase shifter, wherein the satellite tracking system searches, positions, and tracks a target satellite in accordance with the control signal.

Another aspect of the present disclosure provides a satellite tracking system, comprising an array of antenna elements, wherein a feed current for each of the antenna elements passes through a phase shifter; one or more processors; and one or more computer-readable non-transitory storage media coupled to the one or more processors and comprising instructions operable when executed by the one or more processors to cause the satellite tracking system to generate a control signal for the phase shifter, wherein the satellite tracking system searches, positions, and tracks a target satellite in accordance with the control signal.

Another aspect of the present disclosure provides a satellite tracking method, comprising providing an array of antenna elements in a satellite tracking system, wherein a feed current for each of the antenna elements passes through a phase shifter; generating, by a control unit of the satellite tracking system, a control signal for the phase shifter; searching, by the satellite tracking system, for a target satellite in accordance with the control signal; positioning, by the satellite tracking system, the target satellite in accordance with the control signal; tracking, by the satellite tracking system, the target satellite in accordance with the control signal; and determining, by the control unit, whether an azimuth angle and an elevation angle of the target satellite are within a predetermined range, and if affirmative, determining whether a signal of the target satellite is within a communication range, and if otherwise, returning to searching for the target satellite in accordance with the control signal.

Although the present disclosure and its advantages have been described in detail, it should be understood that various changes, substitutions and alterations can be made herein without departing from the spirit and scope of the disclosure as defined by the appended claims. For example, many of the processes discussed above can be implemented in different methodologies and replaced by other processes, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, and steps.

What is claimed is:

1. A satellite tracking system, comprising:
an array of antenna elements, wherein a feed current for each of the antenna elements passes through a phase shifter;
one or more processors; and
one or more computer-readable non-transitory storage media coupled to the one or more processors and comprising instructions operable when executed by the one or more processors to cause the satellite tracking system to generate a control signal for the phase shifter, wherein the satellite tracking system searches, positions, and tracks a target satellite in accordance with the control signal.

2. The satellite tracking system of claim 1, the one or more computer-readable non-transitory storage media further comprising instructions operable when executed by the one or more processors to cause the satellite tracking system to search for the target satellite by approximating a location of the possible target satellite with a step scan operation, and use a particle swarm optimization operation to find the location of the target satellite which has a stronger signal in accordance with the control signal, wherein the particle swarm optimization operation uses the approximate location of the possible target satellite as one of the initial particle and n−1 randomly generated other initial particles, where n is a natural number.

3. The satellite tracking system of claim 1, the one or more computer-readable non-transitory storage media further comprising instructions operable when executed by the one or more processors to cause the satellite tracking system to position the target satellite by compensating for a shift while searching for the target satellite in accordance with the control signal, wherein the search result is used as a positioning center, and a step scan operation of three degrees outward with one degree resolution is used to optimally position the target satellite.

4. The satellite tracking system of claim 1, the one or more computer-readable non-transitory storage media further comprising instructions operable when executed by the one or more processors to cause the satellite tracking system to track the target satellite by using a conical scan operation of a plurality of sample points to determine a movement vector and a movement displacement in accordance with the control signal.

5. The satellite tracking system of claim 4, the one or more computer-readable non-transitory storage media further comprising instructions operable when executed by the one or more processors to cause the satellite tracking system to compute the movement vector of the antenna elements as:

$$\vec{d} = \frac{\sum_{i=1}^{N}(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center.

6. The satellite tracking system of claim 5, the one or more computer-readable non-transitory storage media further comprising instructions operable when executed by the one or more processors to cause the satellite tracking system to compute the movement displacement of the antenna elements as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, θ is the scan angle, and $g^{-1}$ is the inverse of the first derivative of the signal function.

7. The satellite tracking system of claim 1, the one or more computer-readable non-transitory storage media further comprising instructions operable when executed by the one or more processors to cause the satellite tracking system to determine whether an azimuth angle and an elevation angle of the target satellite are within a predetermined range, and if affirmative, the satellite tracking system determines whether a signal of the target satellite is within a communication range, otherwise the satellite tracking system returns to searching for the target satellite in accordance with the control signal.

8. A satellite tracking method, comprising:
providing an array of antenna elements in a satellite tracking system, wherein a feed current for each of the antenna elements passes through a phase shifter;
generating, by a control unit of the satellite tracking system, a control signal for the phase shifter;
searching, by the satellite tracking system, for a target satellite in accordance with the control signal;
positioning, by the satellite tracking system, the target satellite in accordance with the control signal;
tracking, by the satellite tracking system, the target satellite in accordance with the control signal; and
determining, by the control unit, whether an azimuth angle and an elevation angle of the target satellite are within a predetermined range, and if affirmative, determining whether a signal of the target satellite is within a communication range, and if otherwise, returning to searching for the target satellite in accordance with the control signal.

9. The satellite tracking method of claim 8, wherein searching, by the satellite tracking system, for the target satellite is performed by approximating a location of the possible target satellite with a step scan operation, and the method further comprises using a particle swarm optimization operation to find the location of the target satellite which has a stronger signal in accordance with the control signal, wherein the particle swarm optimization operation uses the approximate location of the possible target satellite as one of the initial particle and n−1 randomly generated other initial particles, where n is a natural number.

10. The satellite tracking method of claim 8, wherein when the target satellite has been detected successfully, the method further comprises positioning, by the satellite tracking system, the target satellite by compensating for a shift while searching for the target satellite in accordance with the control signal, wherein the search result is used as a positioning center, and a step scan operation of three degrees outward with one degree resolution is used to optimally position the target satellite.

11. The satellite tracking method of claim 8, further comprising tracking, by the satellite tracking system, the target satellite by using a conical scan operation of a plurality of sample points to determine a movement vector and a movement displacement in accordance with the control signal.

12. The satellite tracking method of claim 11, further comprising computing, by the satellite tracking system, the movement vector of the antenna elements as:

$$\vec{d} = \frac{\sum_{i=1}^{N}(rsl_i * (sp_i - c))}{N/2}$$

where $\vec{d}$ is the movement vector, N is the number of sample points, $rsl_i$ is the signal of the $i^{th}$ sample point, $sp_i$ is the position of the $i^{th}$ sample point, and c is the position of the antenna beam pointing center.

13. The satellite tracking method of claim 12, further comprising computing, by the satellite tracking system, the movement displacement of the antenna elements as:

$$c_{new} = c_{old} + \left| g^{-1}\left(\frac{|\vec{d}|}{2\theta}\right) - g^{-1}(0) \right| * \frac{\vec{d}}{|\vec{d}|}$$

where $c_{new}$ is the new antenna beam pointing center, $c_{old}$ is the old antenna beam pointing center, $|\vec{d}|$ is the scalar of the movement vector, θ is the scan angle, and $g^{-1}$ is the inverse of the first derivative of the signal function.

* * * * *